Sept. 13, 1938.  F. LOUISOT  2,129,697

MOLD AND METHOD OF MAKING THE SAME

Filed Oct. 18, 1935  2 Sheets-Sheet 1

Inventor:
Felix Louisot

By Geo. B. Rawlings.
Attorney.

Sept. 13, 1938.  F. LOUISOT  2,129,697
MOLD AND METHOD OF MAKING THE SAME
Filed Oct. 18, 1935  2 Sheets-Sheet 2
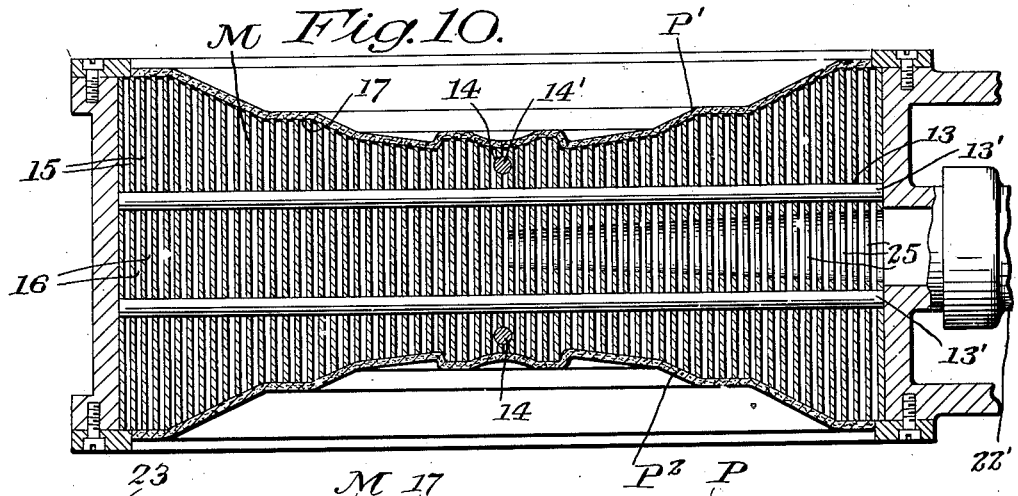
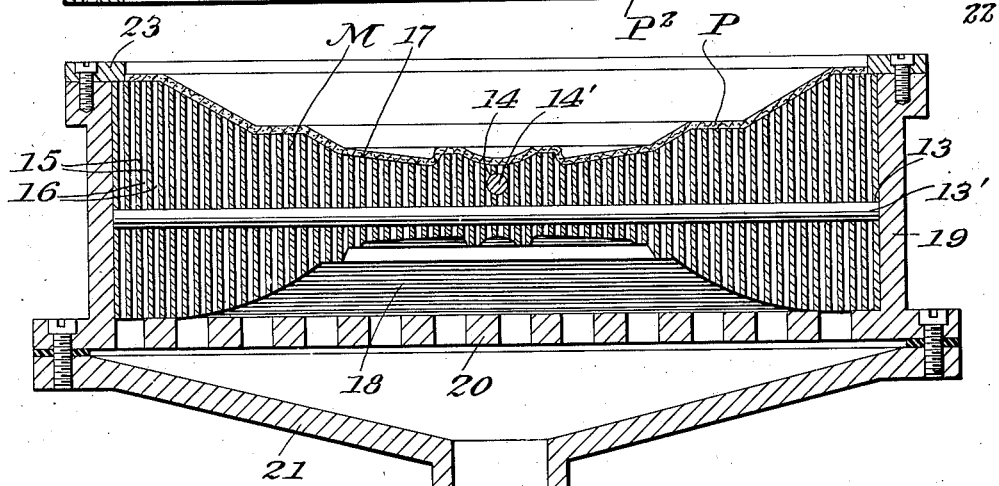
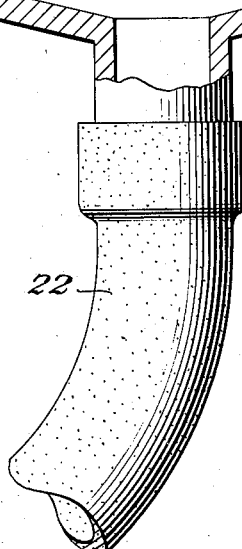
Inventor
Felix Louisot
By Geo. B. Rawlings
Attorney Patented Sept. 13, 1938

2,129,697

UNITED STATES PATENT OFFICE 2,129,697

MOLD AND METHOD OF MAKING THE SAME

Felix Louisot, Hasbrouck Heights, N. J., assignor to William M. Sheffield, New York, N. Y.

Application October 18, 1935, Serial No. 45,582

14 Claims. (Cl. 92—54)

This invention relates to improvements in suction molds and methods of constructing the same. For the purposes of this application, I shall discuss my mold in its relation to the molding of such a well-known material as wood or other pulp. It is to be understood however that this discussion is purely for purposes of illustration and in no way limiting, and that the principles of my invention apply to the molding and/or filtering of a wide variety of other materials and/or mixtures.

Suction molds or dies for forming molded pulp articles by the well-known pulp sucking process are as old as the art itself. In the early development of the art, such molds were simple wire screens mounted over or around a perforated suction head. More recently, laminated molds or dies in accordance with the principles of my Patent No. 1,605,358 and the Sheffield patents Nos. 1,650,771 and 1,984,384 have been used in place of the wire screen molds of the early art.

The initial cost of the laminated die however is considerably greater than that of the wire screen type, due to the large number of laminae required and the time and care necessary in machining and assembling the same. The laminated die of course produces an article of superior structure and appearance in that the pulp is evenly deposited and uniformly drained in all areas, regardless of variations in the steepness of the article in different sections thereof, thus enabling the production of articles which are deeply recessed or of sharply angled contour, to say nothing of greatly reducing the tendency of the article to entwine itself behind the wire strands thus retarding its removal from the mold to warp in drying.

My present invention is directed to the problem of a mold or die which will possess all of the advantages of the laminated die, while at the same time being capable of production at a considerably lower cost than the laminated die. In solving this problem I have devised a mold or die of new type as well as a unique method of making such mold or die.

According to my invention, I construct my mold or die as a continuous spiral, the turns or convolutions of which are uniformly spaced apart and positively maintained in proper spacement at all times so as to afford a plurality of non-clogging, easily-cleanable suction and drainage passages continuously from top to bottom of the spiral.

One face of the spiral is machined or otherwise contoured or patterned to impart to the article molded thereon the desired shape and configuration when suction is applied to the opposite face of the spiral to draw the liquid from the pulp mixture through the aforesaid passages and thereby cause the fibres of such mixture to deposit on the molding face or edges of the spiral.

If desired, however, both faces or edges of the spiral may be machined with different contours or patterns, thus enabling the same mold or die to be used in the production of two different articles or of two differently patterned articles.

The spaces between the turns or layers of the spiral afford suction and drainage passages which are continuous from top to bottom of the spiral and moreover are definitely and positively maintained in proper spacement at all times and under all conditions of use of my mold or die. Hence it results that the tendency of the pulp to collect within and clog said passages, and thereby cause thin places or holes in the formed article is reduced to the minimum, if not wholly eliminated.

Should for any reason, however, the mold or die become clogged, it may be readily cleaned by unwinding the spiral, cleaning out the clogged part, and re-winding and re-fastening, or by applying air, liquid, steam, or sand blast under pressure to the end or face of the mold opposite to the end or face which is clogged, thereby avoiding the necessity of taking the mold apart.

In the accompanying drawings I have shown embodiments of my invention which well illustrate the principles involved. I have also illustrated in detail my novel method of producing such mold.

In such drawings:—

Figure 3:
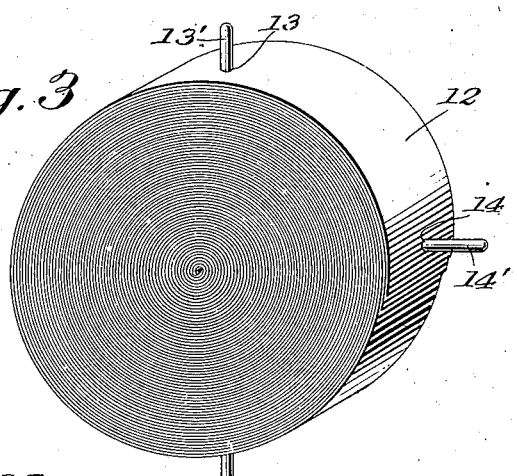

Fig. 3 shows them completely intercoiled and the resultant roll drilled or reamed to receive the withdrawable pins or dowels which temporarily retain the twin strips in intercoiled condition while one or both faces thereof are being milled or otherwise machined to impart thereto the configuration or pattern which it is desired that the mold face or faces of the individual molds shall have when the intercoiled strips are separated from each, rewound and repinned as individual spiral molds.

Figure 4:
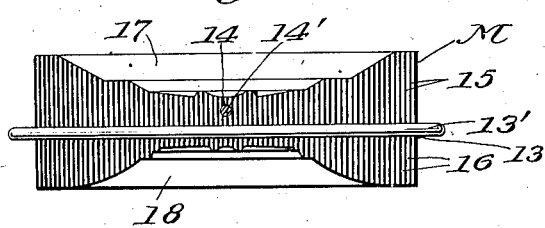

Fig. 4 is a vertical section through one of the completed individual spiral molds which results when after the roll of Fig. 3 has been machined, the intercoiled strips separated from each other, and one of them has been re-wound and re-pinned as a complete mold.

Figure 5:
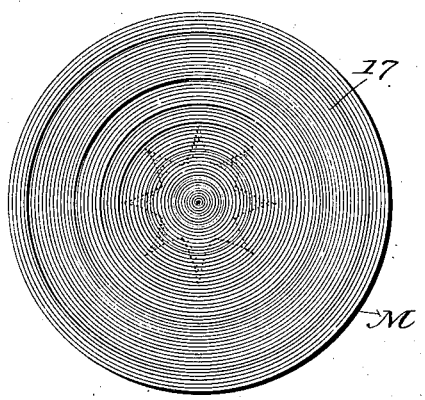
Figure 6:
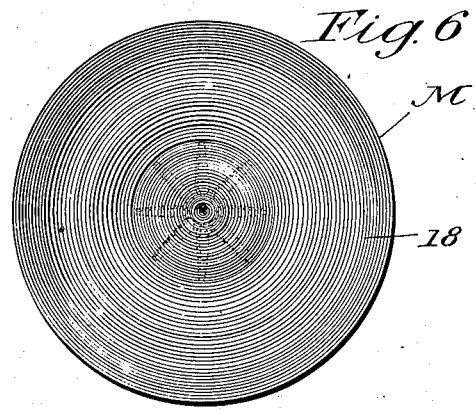

Figs. 5 and 6 show the application of different patterns or configurations to the top and bottom faces, respectively, of the individual spiral mold of Fig. 4.

Figure 8:
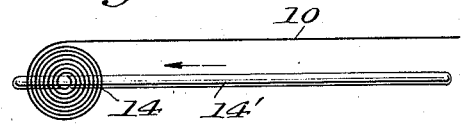
Figure 7:
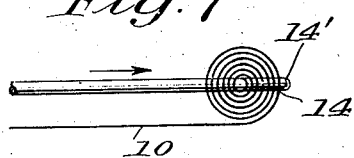

Figs. 7 and 8 are diagrams showing the method of winding or re-winding and pinning together the several turns or convolutions of the mold of Fig. 4 to retain them in properly spaced condition.

Fig. 9 is a vertical section showing the spiral mold of Fig. 4 mounted in the conventional holder of a pulp molding machine of usual type, and Fig. 10 is a similar view of a modification designed to enable the simultaneous formations of two pulp articles on a single mold.

As previously indicated, my concept is a mold made of one continuous strip of material wound in the form of a spiral, the several turns, layers or convolutions of the spiral being definitely spaced apart and being positively maintained in such spaced apart relationship by suitable means.

These spaces provide from top to bottom of the mold a plurality of free, unobstructed drainage passages between the several turns, layers or convolutions constituting the spiral, thus reducing to the minimum the tendency of the mold to clog or fill up. These drainage passages are devoid of seats or turns which would enable the pulp to obtain a footing and start building up within said passages, as in the standard laminated mold where the spacing laminae have to follow the irregular contours of the face of the mold.

The method of constructing my mold makes possible very considerable savings in time and cost in engraving and machining, for in accordance with my preferred method, two duplicate strips are simultaneously wound together, into roll form, one strip acting as a mandrel for the other, pinned, engraved and machined, after which the twin molds are unpinned, separated, and individually wound and pinned as complete single strip molds.

The winding, disassembling, and re-winding steps are simple and easy, due to the fact that each mold is of continuous single strip construction instead of a plurality of strips or laminations, as in the standard laminated die on which my invention is an improvement.

In constructing my continuous strip mold, I proceed as follows:—

Figure 1:
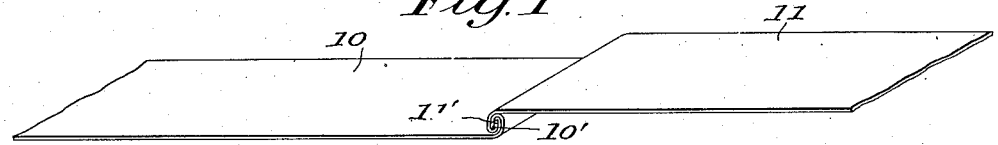
Fig. 1 is a perspective view showing two duplicate strips or ribbons of suitable material engaged end-to-end preparatory to being intercoiled or interwound with each other into a tight roll.

Two duplicate strips 10 and 11 of any suitable material, preferably brass or like non-corrosive material, and of the necessary width, length and gauge to form twin dies or molds of the desired size, are laid one upon the other (Fig. 1) with their adjacent ends bent, curled or otherwise interlocked with each other as indicated at 10' and 11'.

Figure 2:
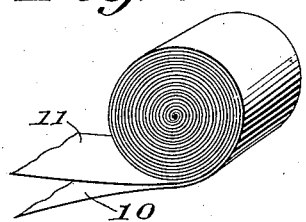
Fig. 2 shows the twin strips partially intercoiled.

Both strips are then intercoiled or interwound (Fig. 2) with one another to form a tightly coiled body or roll 12 (Fig. 3) of circular or other shape.

In this condition the roll 12 is drilled and reamed to form alining holes 13 and 14 in the intercoiled strips 10 and 11. Pins, dowels, or other withdrawable fastenings 13' and 14' are next inserted in said holes 13 and 14 to keep the strips in alinement and to prevent the roll from uncoiling while the desired configuration or pattern is being machined into the top and/or bottom edges of the assembled strips.

This engraving step may be done in any suitable manner, as by any usual pattern-controlled engraving or routing machine, or by hand.

After machining is completed, the dowels 13' and 14' are withdrawn and the roll 12 unwound to permit separation of the two spirally wound strips 10 and 11 and subsequent rewinding and re-pinning of them individually as individual molds (see Fig. 4).

As a result of the intercoiling step each separated strip now exists as a spiral, the turns or layers or convolutions 15 of which are spaced apart a distance corresponding to the thickness of the companion strip. The spaces 16 between said turns or layers constitute suction and drainage passages which extend continuously from top to bottom of each spiral.

As a result of the engraving step the top and/or bottom edges of the turns or layers 15 of both spirals had formed therein the desired contourings, configurations, or patterns 17 and 18 for (Figs. 5 and 6) the ultimate molded articles.

As a result of the drilling and reaming step, both spirals had formed therein from end to end of the strips one or more rows of regularly spaced holes 13 and 14.

To avoid duplication of the drawings only one of the twin molds M obtained by the above described method is illustrated (see Fig. 4). The companion mold which was produced simultaneously with that of Fig. 5 is however identical with the one shown in Fig. 4. In fact, it is one of the salient features of my method of manufacture that I am able simultaneously to obtain two duplicate molds.

The completed mold M shown in Fig. 4, however, was obtained by rewinding and re-pinning one or the other of the strips 10 or 11; that is to say, after the roll 12 had been unwound and the spirally coiled strips 10 and 11 had been separated from one another, each strip was individually rewound and fastened.

In re-winding a strip 10 or 11 to form the completed mold of Fig. 4, the re-winding operation is started from the same end 10' or 11' of the strip at which winding had been originally started. As re-winding progresses, at least one of the dowels 13' or 14' is inserted through two of the alining dowel holes 13' or 14' and pushed towards the center of the coil. The coil is then wound up a half-turn to bring a succeeding dowel hole in alinement with the dowel, and the dowel pushed in the opposite direction to cause it to enter the same (see Figs. 7 and 8). This operation is repeated until the entire coil is rewound, after which the other dowel or dowels are inserted in the other dowel holes and the mold is ready for use.

The spacement of the several turns, layers or convolutions of each spiral is definite and uniform. This is due to the fact that when both strips were originally interwound (Figs. 1, 2 and 3) each strip acted as a mandrel or winding core for the other, and hence the turns, layers or convolutions of each spiral were regularly spaced apart from each other when the two spirals were afterwards separated, re-wound, and re-pinned as individual, complete, single strip molds. The suction and drainage passages 16 afforded by these spaces are thus uniform in all areas of the mold.

This regularity or uniformity of spacement of the turns, layers, or convolutions of each spiral is maintained by the dowel pins. These pins not only prevent relative movement of the turns or layers one upon the other, but they also maintain the irregular face contours 17 or 18 in alinement as well as acting as supports for the entire mold. Although these dowels intersect the suction and drainage passages 16 constituted by the spaces between said turns or layers, they do not interfere with the suction or drainage effect in such passages.

In Fig. 9 I have shown the mold M of Fig. 4 applied to the conventional suction head of a standard type of pulp molding machine. In this figure I have indicated at 19 a holding frame within which said mold is mounted. The perforated bottom 20 of the frame 19 is bolted or otherwise secured to a suction head 21 having any usual suction and drainage connection 22. The usual forming die ring 23 preferably slightly overlaps the upper marginal edge of the mold and defines the edge of the pulp deposit P.

In practice, it will be understood that the mold M is immersed in a tank containing the liquid pulp mixture. Suction from hose 22 is applied through passages 16 until a deposit of pulp P of the desired thickness is built up on the contoured upper edges of the turns or layers 15 of the mold constituting the forming face of the mold.

In accordance with usual pulp molding practice, the mold is then removed from the tank, or the tank from the mold, depending upon the type of molding machine employed, and the formed article drained, the passages 16 carrying off the drainage water. When sufficiently drained, the suction through hose 22 is discontinued, and the formed article may be removed from the forming die or mold and dried.

If desired, however, the article while still retained by suction on the forming die or mold may be pressed, by a pressing die to further shape and densify it. Or if desired it may be transferred from the forming die or mold to the pressing die during the pressing operation and while held on the pressing die, may be contacted by a heated drying die, or if desired it may be removed from the pressing die after the pressing operation and dried in any usual drier.

In the modification of Fig. 10 I show a spiral mold designed simultaneously to form two pulp articles, thus doubling the capacity of the mold without increasing the cost of operation. The two articles thus simultaneously formed may be duplicates of one another or may be different as to their contour or pattern.

In this form of my invention both molding faces are suitably patterned or contoured as at 17'—18' and a layer of pulp P' or P² is simultaneously deposited on each mold face, suction is applied laterally of the mold and parallel to the molding faces as at 22', and the several turns or convolutions of the mold on the suction side of the mold being apertured as at 25 in continuation of the line of the suction connection 22'.

The apertures 25 constitute a continuous suction and drainage passage transversely of the mold, which passage tapers from the center toward the outer edge of the mold, the apertures being of progressively increasing diameter from the center outwardly.

Obviously if desired, suction may be applied to both sides of the mold instead of at only one side at Fig. 10 in which event, the suction connection 22' of Fig. 10 would be duplicated at the other side of the mold and the apertures 25 in the turns or layers of the mold would be duplicated at that side of the mold. Obviously also when only one face of the mold is used as the molding face, suction may be applied vertically to the molding face not used, as shown in Fig. 9, or laterally of the mold as shown in Fig. 10 or by a combination of both vertical and lateral suction supplies, where an unusually rapid rate of pulp deposit is wanted.

While my mold is particularly adapted for producing molded pulp articles, it is not exclusively limited to such use. Materials or mixtures other than pulp mixtures may be molded thereon, as for example clay, or my mold may be used as a suction filter for filtering certain kinds of materials and mixtures.

These and analogous uses are all within the purview of my invention, as are any changes in structure and method of manufacture which may be necessary to adapt my mold to the particular use, materials or mixtures selected.

What I therefore claim and desire to secure by Letters Patent is:—

1. A suction mold comprising a continuous strip wound in the form of a spiral, the convolutions of which are regularly spaced apart to provide suction passages, and have a row of spaced holes therein which are alined with each other through the several convolutions of the spiral, and a pin closely fitting said holes and penetrating the several convolutions of the spiral to maintain the spacement of the same.

2. The method of making a suction mold, which consists in interwinding a pair of duplicate strips with one another into general roll form, in temporarily fastening said roll against uncoiling, in machining one face of said roll, in uncoiling such roll and separating said spirally wound strips, in individually rewinding each strip into a spiral, and in finally fastening each rewound spiral against uncoiling.

3. The method of making a spiral mold, which consists in interwinding a pair of duplicate strips with one another into general roll form, in temporarily inserting a withdrawable pin through said roll to restrain it against uncoiling, in machining one face of said roll, in withdrawing said pin to permit the roll to be uncoiled and the spirally wound strips to be separated, and in individually rewinding each strip into a spiral using said pin or a duplicate thereof as a fastening to prevent the spiral from uncoiling during and after rewinding.

4. The method of making a spiral mold, which consists in interengaging the adjacent ends of a pair of duplicate strips, in interwinding said strips with one another into general roll form, in drilling said roll to form a row of regularly spaced holes in each of said intercoiled strips, in temporarily inserting a withdrawable pin through said holes to restrain said roll against uncoiling, in machining one face of said roll, in withdrawing said pin to permit the roll to be uncoiled and the spirally wound strips to be separated, and in individually rewinding each strip into a spiral using said pin or a duplicate thereof as a fastening to prevent the spiral from uncoiling during and after rewinding.

5. In a pulp molding machine for molding individual articles from a liquid pulp mixture, a die holder and a suction head carrying said die holder, a perforated member between said die holder and suction head, said suction head having a suction chamber beneath said perforated member and having a suction and drainage connection to said suction chamber, and a suction die or mold mounted within said die holder adapted to be immersed in the liquid pulp mixture and comprising a continuous strip having holes therein and wound in the form of a spiral, the turns of said strip being regularly spaced apart to provide continuous unobstructed suction and drainage passages from top to bottom of the spiral, at least one face of said spiral being contoured, and pins closely fitting said holes and penetrating the spiral for maintaining the spacement of said turns during contouring of the die or mold face.

6. The machine of claim 5, and a forming ring at the upper edge of the die holder for defining the edge of the pulp deposit on the contoured upper face of the die.

7. In a pulp molding machine for molding individual articles from a liquid pulp mixture, a die holder, a suction die or mold therein adapted to be immersed in the liquid pulp mixture and comprising a strip having holes therein and wound in the form of a spiral, the turns of said spiral being regularly spaced apart to provide therebetween suction passages which are open from top to bottom of the die or mold, at least one face of said die or mold being contoured, pins closely fitting said holes and penetrating the turns of the spiral for maintaining the spacement of said turns during contouring of the die or mold face and during use of the die or mold, the turns of the spiral between the top and bottom of the die or mold being apertured to provide a suction passage extending transversely of the die or mold and progressively increasing in diameter from the center to one side thereof, and a suction and drainage connection at said side of the die or mold in substantial continuation of said transverse passage.

8. A laminated die adapted to be immersed in a liquid pulp mixture for the suction formation of individual molded pulp articles, comprising a continuous strip wound into the form of a spiral, the turns of which are spaced apart to provide axially extending suction passages which are open substantially continuously from top to bottom of the die and the edge of the strip at one end of the mold or die being contoured to constitute a molding face, and a member extending transversely of the axis of the die and independent of the strip and penetrating the turns of the strip for maintaining the spacement of the turns.

9. The die of claim 8, the strip having spaced holes intermediate of its edges, and the means penetrating the turns of the strip being pins closely fitting said holes.

10. A laminated die adapted to be immersed in a liquid pulp mixture for the suction formation of individual molded pulp articles, comprising a continuous strip wound into the form of a spiral the turns of which are spaced apart to provide axially extending suction passages which are open substantially continuously from top to bottom of the die, the top and bottom edges of the strip being contoured to constitute molding faces, and the turns of the strip intermediate of their top and bottom edges being apertured to provide a suction passage extending transversely of the die from adjacent the center thereof to one side thereof for communication with a suction and drainage connection, and a member extending through the consecutive turns of the strip for preventing relative movement of the turns one upon the other.

11. In a pulp molding machine, a die holder, a laminated die mounted in said holder and adapted to be immersed in a liquid pulp mixture for the suction formation of individual molded pulp articles, said die comprising a continuous strip wound into the form of a spiral, the turns of which are spaced apart to provide axially extending suction passages and the top and bottom edges of which are contoured to constitute molding faces, and means for applying suction to said passages intermediate of said contoured edges when said die is immersed in the pulp stock to simultaneously deposit a layer of pulp on each of said molding faces, and a member extending through the consecutive turns of the strip for preventing relative movement of the turns one upon the other.

12. In a pulp molding machine, a die holder, having a perforated bottom, a laminated die in said holder adapted to be immersed in a liquid pulp mixture for the suction formation of individual molded pulp articles, said die comprising a continuous strip wound into the form of a spiral the turns of which are disposed edgewise with respect to said perforated bottom and are spaced apart to provide axially extending suction passages which are open substantially from top to bottom of the die, the edges of the strip at the end of the die remote from the perforated bottom of the holder being contoured to constitute a molding face, and a suction and drainage connection to said passages at the end of the die adjacent the perforated bottom of the holder, and a member extending through the consecutive turns of the strip for preventing relative movement of the turns one upon the other.

13. In the method of making a laminated die for the suction formation of individual molded pulp articles from a liquid pulp mixture, the steps which consist in winding a continuous strip into the form of a spiral the turns of which are spaced apart to provide axially of the die suction passages which are open substantially continuously from top to bottom of the mold, in inserting transverse fasteners through the turns of the strip to maintain them in the relation stated, and in contouring the edges of the strip at one end of the die to constitute a molding face.

14. The method of claim 13, the strip being wound over a spiral mandrel having a thickness substantially equal to the distance the turns of the strip are spaced apart.

FELIX LOUISOT.